(12) United States Patent
Horttanainen et al.

(10) Patent No.: US 7,000,688 B2
(45) Date of Patent: Feb. 21, 2006

(54) SUPPLY AIR TERMINAL DEVICE

(75) Inventors: Pekka Horttanainen, Lahti (FI);
Marko Häkkinen, Kuusankoski (FI);
Mika Ruponen, Lahti (FI); Reijo Villikka, Kausala (FI); Maija Virta, Hamina (FI)

(73) Assignee: Halton Oy, Kausala (FI)

( * ) Notice: Subject to any disclaimer, the term of this patent is extended or adjusted under 35 U.S.C. 154(b) by 130 days.

(21) Appl. No.: 09/990,239

(22) Filed: Nov. 21, 2001

(65) Prior Publication Data

US 2002/0062948 A1    May 30, 2002

(30) Foreign Application Priority Data

Nov. 24, 2000   (FI)   ................................. 20002589

(51) Int. Cl.
*F24F 3/04*     (2006.01)
*F24F 13/04*    (2006.01)

(52) U.S. Cl. ..................... 165/123; 165/53; 165/96; 454/264

(58) Field of Classification Search ................ 165/123, 165/96, 99, 53; 454/264
See application file for complete search history.

(56) References Cited

U.S. PATENT DOCUMENTS

| | | | |
|---|---|---|---|
| 2,937,588 A | 5/1960 | Masin et al. ................ 98/38 |
| 3,041,047 A | 9/1962 | Ashley et al. ............... 257/297 |
| 3,186,327 A | 6/1965 | Giurlando et al. | |
| 3,669,349 A | 6/1972 | Hall, Jr. ...................... 236/13 |
| 3,752,226 A | 8/1973 | Bullock ........................ 165/59 |
| 3,823,870 A * | 7/1974 | Chandler ..................... 454/264 |
| 3,937,132 A | 2/1976 | Bruhlmeier et al. .......... 98/40 |
| 3,981,326 A | 9/1976 | Gorchev ....................... 137/604 |
| 4,148,435 A | 4/1979 | Meyers et al. ................ 236/13 |
| 4,178,840 A | 12/1979 | Caknis | |
| 4,448,111 A | 5/1984 | Doherty ........................ 98/38 |
| 4,522,255 A * | 6/1985 | Baker ........................... 165/53 |
| 4,616,559 A | 10/1986 | Barlow ......................... 98/40.11 |
| 5,180,331 A | 1/1993 | Daw et al. ................... 454/187 |
| 5,218,998 A | 6/1993 | Bakken et al. ............... 137/625.28 |
| 5,427,146 A | 6/1995 | Bakken et al. ............... 137/625.3 |

FOREIGN PATENT DOCUMENTS

| | | |
|---|---|---|
| AU | 6761681 | 9/1981 |
| CA | 988359 | 5/1976 |
| DE | 17781288 | 11/1971 |
| DE | 2551078 | 5/1977 |
| DE | 2841409 | 4/1980 |
| DE | 3303987 | 8/1984 |

(Continued)

*Primary Examiner*—Leonard R. Leo
(74) *Attorney, Agent, or Firm*—Steinberg & Raskin, P.C.

(57) ABSTRACT

The invention concerns a supply air terminal device (10) including side plates (12) and an air guiding part (13). A heat exchanger (14) is fitted in the device below a supply air chamber (11) for supply air in between air guiding parts (13) located on both sides of the central axis ($Y_1$) of the device. In the device, the supply air chamber (11) includes nozzle apertures ($12a_1, 12a_2, \ldots, 12b_1, 12b_2 \ldots$) to conduct fresh supply air into a side chamber ($B_1$) and to induce a flow of circulated air ($L_2$) from the room space through the heat exchanger (14) into the side chamber ($B_1$). Using the heat exchanger (14) the circulated air may be either cooled or heated. The equipment includes a control device (15) for the induction ratio of the supply air flow ($L_1$) and the circulated air flow ($L_2$) for controlling in which ratio there is fresh air ($L_1$) and circulated air ($L_2$) in the combined air flow ($L_1+L_2$).

13 Claims, 13 Drawing Sheets

FOREIGN PATENT DOCUMENTS

| | | |
|---|---|---|
| DE | 3321612 | 12/1984 |
| DE | 29609754 U1 | 2/1997 |
| EP | 0370246 | 5/1990 |
| EP | 0872694 | 10/1998 |
| EP | 0924475 | 6/1999 |
| EP | 0967443 | 12/1999 |
| EP | 0967444 | 12/1999 |
| EP | 1122501 | 8/2001 |
| FR | 1273329 | 8/1961 |
| FR | 2807501 | 10/2001 |
| GB | 1011742 | 12/1965 |
| GB | 1019077 | 2/1966 |
| GB | 1555563 | 11/1979 |
| GB | 1577039 | 10/1980 |
| GB | 2166863 | 5/1986 |
| GB | 2244804 | 12/1991 |
| GB | 2271175 | 4/1994 |
| GB | 2322934 | 9/1998 |
| GB | 2349688 | 11/2000 |
| GB | 2364117 | 1/2002 |
| JP | 62297656 | 12/1987 |
| JP | 3137429 | 6/1991 |
| WO | 9002297 | 3/1990 |
| WO | 9809115 | 3/1998 |
| WO | 0045094 | 8/2000 |

\* cited by examiner

SUPPLY AIR TERMINAL DEVICE

FIELD OF THE INVENTION

The invention concerns a supply air terminal device.

BACKGROUND OF THE INVENTION

Control of the induction ratio has become a requirement in a supply air terminal device, wherein fresh air is brought by way of the supply air terminal device and wherein room air is circulated through the device. This means that the ratio between the flow volumes of the circulation air flow and the flow of fresh air can be controlled.

OBJECTS AND SUMMARY OF THE INVENTION

In the present application primary air flow means that flow of supply air, and preferably the flow of fresh air, which is supplied into the room or such by way of nozzles in the supply air manifold. Secondary air flow means the circulated air flow, that is, that air flow, which is circulated through a heat exchanger from the room space and which air flow is induced by the primary air flow.

For implementation of the above-mentioned control the present application proposes use of a separate induction ratio control device. In one advantageous embodiment, the induction ratio control device is formed by a damper, where the flow of circulated air is controlled on the inlet side of the heat exchanger by controlling the position of holes in a movable aperture plate, which is located in connection with a fixed aperture plate, in relation to the holes in an aperture plate located in a fixed position. Under these circumstances, the flow of circulated air can be throttled, that is, its pressure loss can be controlled on the supply side of the heat exchanger, and the induction ratio is thus controlled through the device.

According to the invention, the control device may also be located on the outlet side of the heat exchanger in the mixing chamber. Control may hereby take place by controlling the combined air flow $L_1+L_2$ of fresh supply air and circulated air. The more the air flow $L_1+L_2$ is throttled, the lower will the induction ratio be, that is, the air volume made to flow through the heat exchanger becomes smaller in relation to the primary air flow. According to the invention, the control device may also be located on the supply side of side chamber $B_1$ after the heat exchanger, whereby e.g. by a plate movable in a linear direction the induction distance of the supply air flow is controlled, and at the same time the concerned flow $L_2$ of circulated air is controlled. The control plate may be located in the direction of the other channel wall of control mixing chamber $B_1$ and it may be movable in its direction, e.g. by a motor by remote control or manually.

As is known, a jet having a smaller cross-sectional area will induce more circulated air when travelling the same distance. Besides the above-mentioned ways of controlling the induction ratio, such a control device may also be sued, which is formed by a set of nozzles formed by nozzles in two separate rows opening from the supply chamber for fresh air, whereby the nozzles in the first row are formed with a bigger cross-sectional flow area than the nozzles in the second row. In connection with the said nozzles a control device is located, which is formed by an aperture plate used for controlling the flow between the nozzle rows of the said nozzles.

BRIEF DESCRIPTION OF THE DRAWINGS

In the following, the invention will be described by referring to some advantageous embodiments of the invention shown in the figures of the appended drawings, but the intention is not to limit the invention to these embodiments only.

DETAILED DESCRIPTION OF THE INVENTION

Figure 1A:
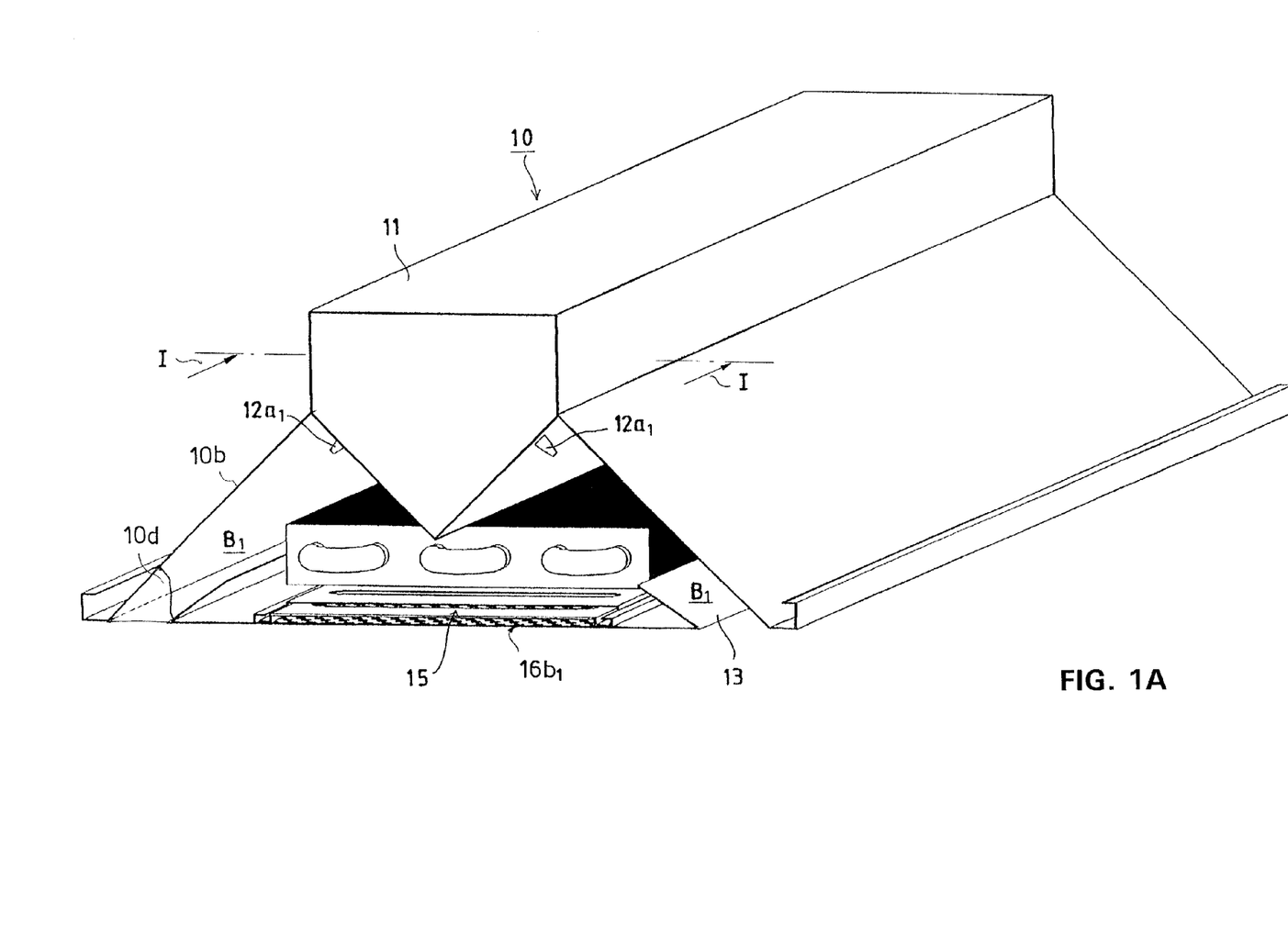
FIG. 1A is an axonometric view of a supply air terminal device according to the invention, which is open at the bottom and closed at the top and on the sides. In the figure, the end wall is cut open in part in order to show the internal structures of the device.

FIG. 1A is an axonometric view of the supply air terminal device 10. For reasons of presentation end wall 10d is cut open in part to show the internal structures. Two end walls 10d and two side plates 10b and a supply air chamber 11 limit side chambers $B_1$, so that the structure is closed at the top and on the sides but open at the bottom. Fresh air is conducted by way of a channel into supply chamber 11, from which the air is conducted further through nozzles $12a_1$, $12a_2$ ... into side or mixing chambers $B_1$ of the device on both sides of the vertical central axis $Y_1$ of the device. The supply air terminal device 11 includes a heat exchanger 14 in between the air guiding parts 13 limiting side chambers $B_1$ in the central area of the device and below supply air chamber 11. For circulated air $L_2$ of the room there is a flow path $E_1$ through heat exchanger 14 into side chambers $B_1$. The said air flow $L_2$, that is, the secondary air flow, is brought about by the primary air flow from nozzles $12a_1$, $12a_2$ ... of supply chamber 11. In the side chambers $B_1$ the air flows $L_1+L_2$ are combined, and the combined air flow is made to flow to the side guided by the air guiding parts 13 and the side plates 10b of the supply air terminal device.

According to the invention, the supply air terminal device 10 includes an induction ratio control device 15. In the embodiment shown in FIG. 1A, the control device 15 is formed by an aperture plate structure controlling the circulated air flow $L_2$, which aperture plate structure in the embodiment shown in FIG. 1A is fitted in between the air guiding parts 13 in relation to the direction of flow of the circulated air flow $L_2$ before the heat exchanger 14.

Figure 1B:
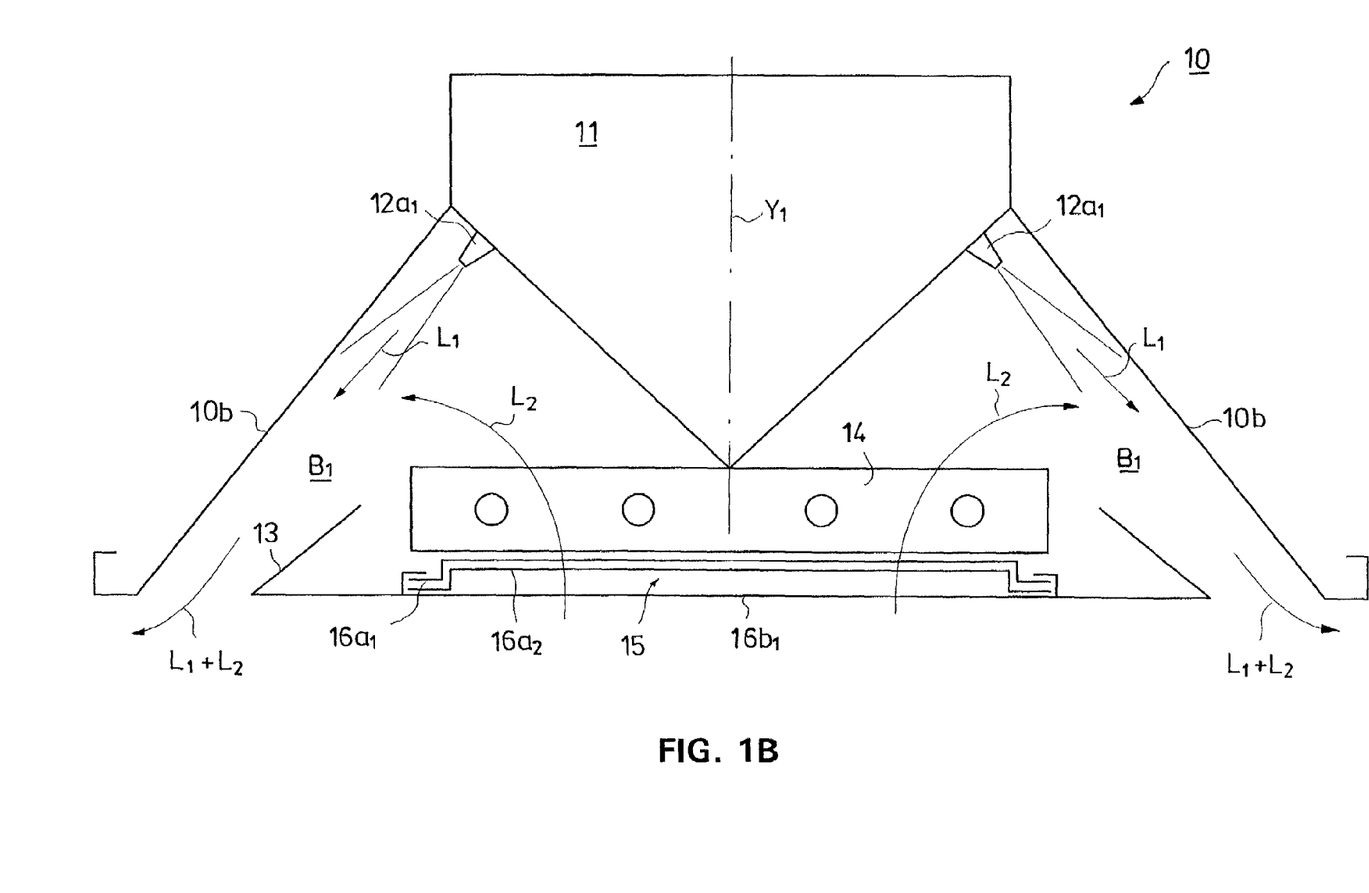
FIG. 1B is a cross-sectional view along line I—I of FIG. 1A.

FIG. 1B is a cross-sectional view along line I—I of FIG. 1A of a first advantageous embodiment of the invention. Supply air terminal device 10 includes a supply air chamber 11 for the supply air $L_1$, from which the air is conducted through nozzles $12a_1$, $12a_2$ ... into the side or mixing chamber $B_1$ of the device and further into room space H. Supply air chamber 11 closes the device 10 from the top. Circulated air $L_2$ induced by the fresh air flows into side chamber $B_1$ from room H, whereby the combined air flow $L_1+L_2$ flows further away from the device, preferably to the side in the horizontal direction at ceiling level. According to the invention, the body R of the device includes side plates 10b and an air guiding part 13, which limit the chamber $B_1$ located at the side of the device. The circulated air flow $L_2$ flows from the centre of the device from between the air guiding parts 13 by way of the heat exchanger 14 located in the central part of the device into side chamber $B_1$ induced by the supply air flow $L_1$. Air guiding part 13 and side plates 12 are shaped in such a way that the combined air flow $L_1+L_2$ will flow in the horizontal direction to the side and preferably in the ceiling level direction and along this in the horizontal direction. The heat exchanger 14 may be used for cooling or heating the circulated air.

The embodiment of FIG. 1B in between air guiding parts 13 is an induction ratio control device 15, which is used for controlling the flow volume of circulated air flow $L_2$ through heat exchanger 14. Hereby the induction ratio $Q_2/Q_1$ is controlled, wherein $Q_2$ is the flow volume of the circulated air flow $L_2$ and $Q_1$ is the flow volume of the supply air $L_1$, that is, of the primary air flow $L_1$. The induction ratio $Q_2/Q_1$ is preferably within a range of 2–6.

In the embodiment shown in FIGS. 1A and 1B, there are preferably aperture plates $16a_1$, $16a_2$ before heat exchanger 14 in between the air guiding parts 13 of the device, looking in the direction of flow of the circulated air flow $L_2$, whereby the circulated air flow $L_2$ conducted through the aperture plates is guided further through heat exchanger 14 into side chambers $B_1$. As was described above, the combined air flow $L_1+L_2$ is guided away from the device, preferably with the aid of air guiding parts 13 guided by these in a horizontal direction to the side. The device is symmetrical in relation to vertical axis $Y_1$.

Figure 1C:
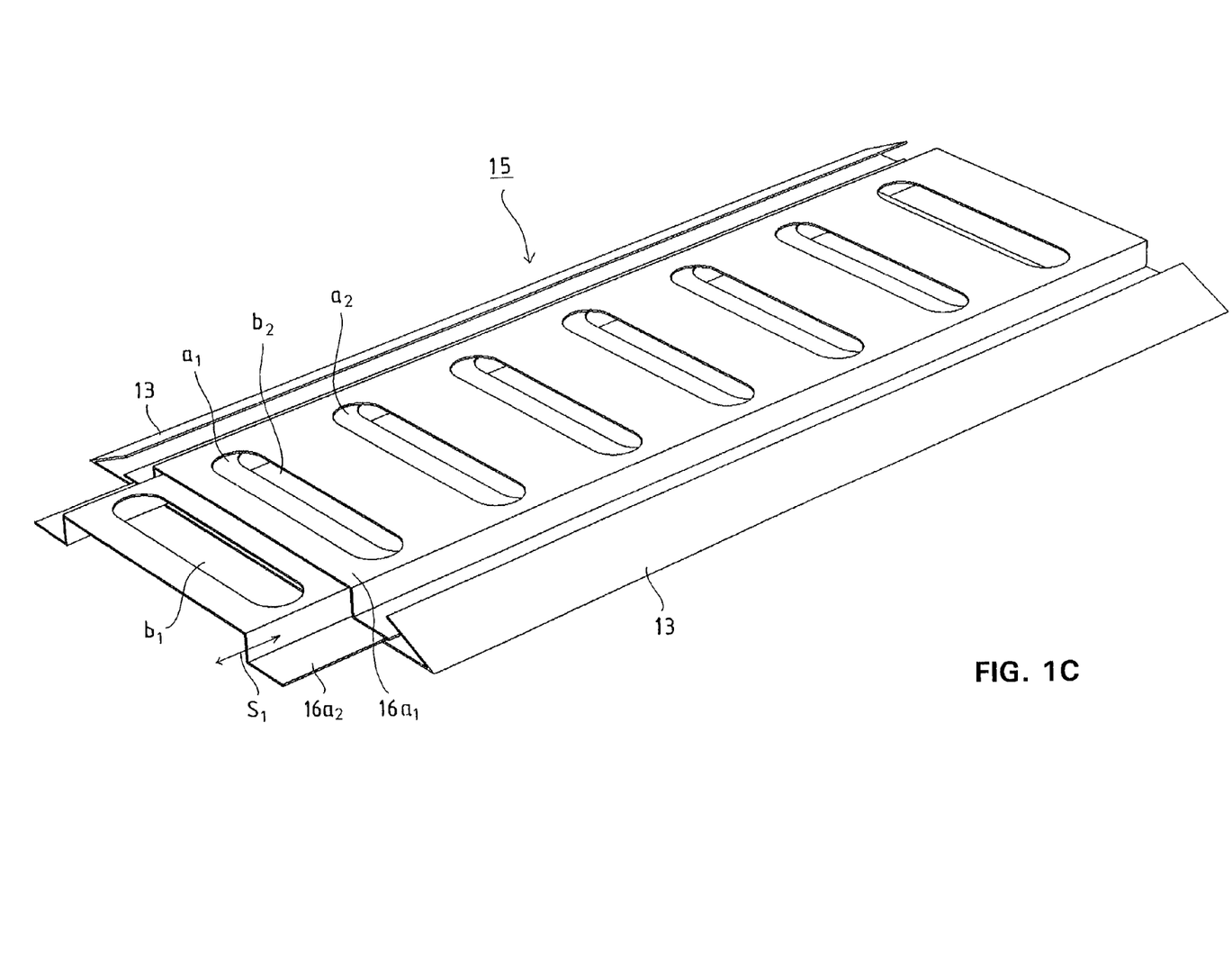
FIG. 1C is an axonometric partial view of the control device structure.

FIG. 1C is a separate view of the induction ratio control device 15. Control device 15 is formed by an aperture plate structure, wherein the structure includes in relation to a first aperture plate $16a_1$ in a fixed position a second movable aperture plate $16a_2$, whereby the apertures $a_1$, $a_2$ ..., $b_1$, $b_2$ ... of the aperture plate $16a_1$, $16a_2$ can be placed in different covering positions in relation to each other, whereby the total cross-sectional flow area through the aperture surface can be controlled and thus the air flow through the aperture surface can be controlled. Thus, that flow $L_2$ can be controlled, which is made to flow through heat exchanger 14. Flow $L_2$ may be closed off entirely in certain conditions of operation.

Figure 1D:
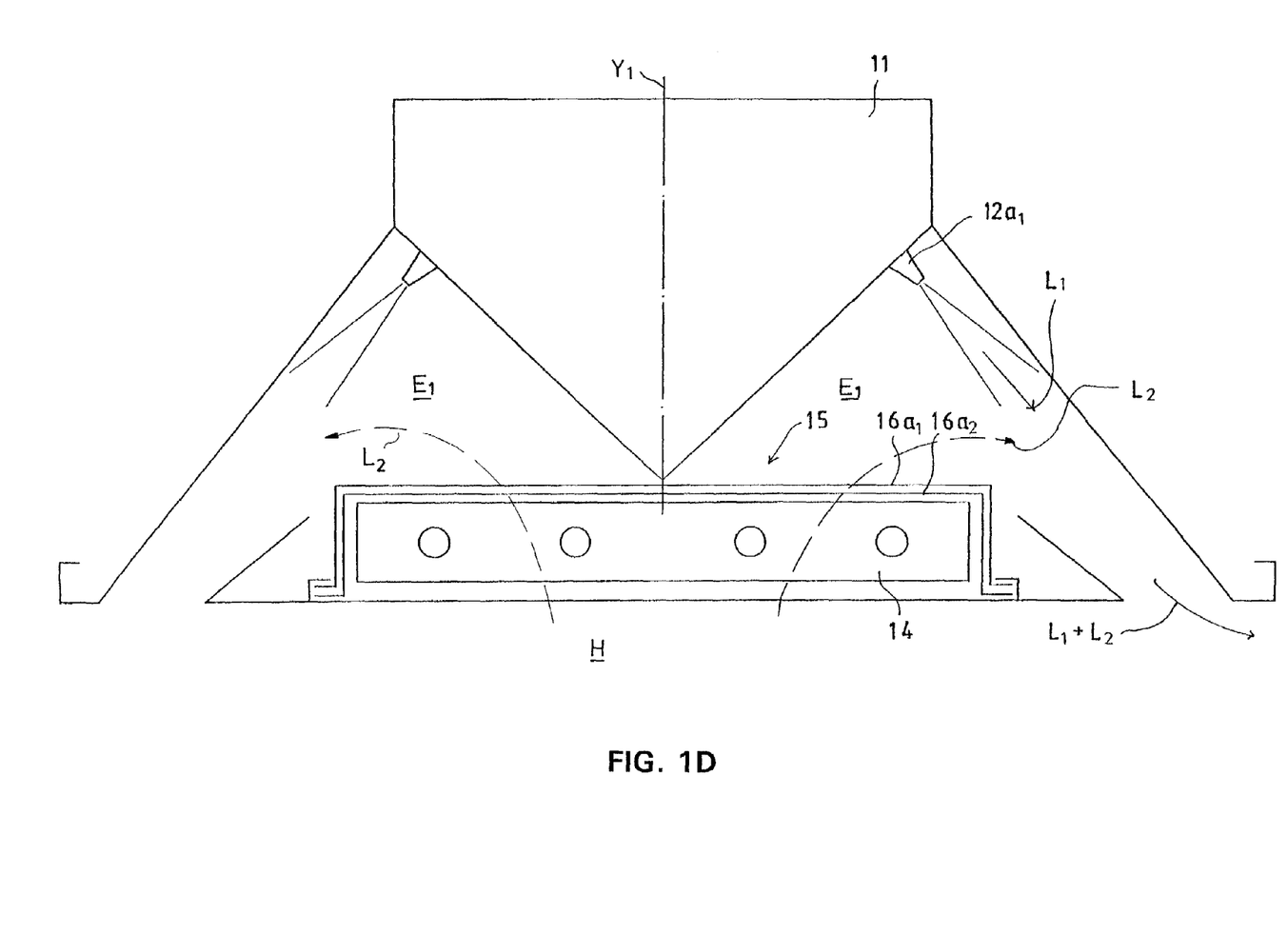
FIG. 1D shows an embodiment of the invention, wherein the induction ratio control device is located after the heat exchanger, looking in the direction of travel of the circulated air flow.

FIG. 1D shows an embodiment of the invention, wherein the induction ratio control device 15 is also formed by an aperture plate structure $16a_1$, $16a_2$, which as seen in the direction of flow of the circulated air flow $L_2$ is fitted on the discharge side of heat exchanger 14. Both in the embodiment shown in FIGS. 1A, 1B and in the embodiment shown in FIG. 1D the structure may also include an architectural third aperture plate or such $16b_1$, which is fitted as a structure opening into the room and preventing visibility into control device 15.

Figure 2A:
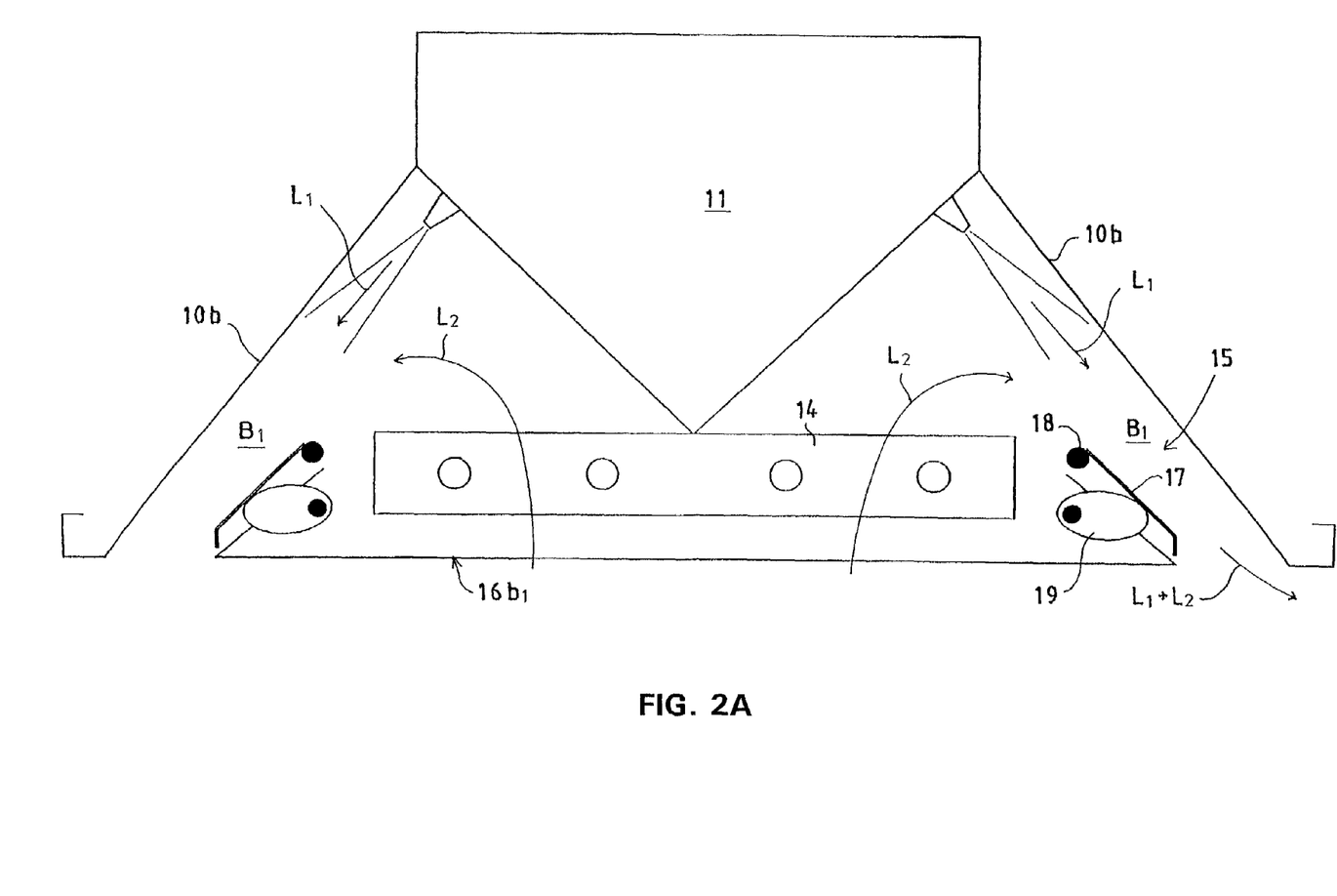
FIG. 2A shows another advantageous embodiment of the control device according to the invention, wherein the control device is located in side chamber $B_1$.

In the embodiment shown in FIG. 2A, the side chamber $B_1$ now includes an induction ratio control device 15 according to the invention. In the embodiment shown in the figure, the control device 15 is formed by a longitudinal damper 17, which can be rotated supported by a joint 18 into different control positions in chamber $B_1$. By turning an eccentric piece 19 the desired control positions are achieved for the damper 17. Both side chambers $B_1$ include a similar induction ratio control device 15 as shown in FIG. 2A.

Figure 2B:
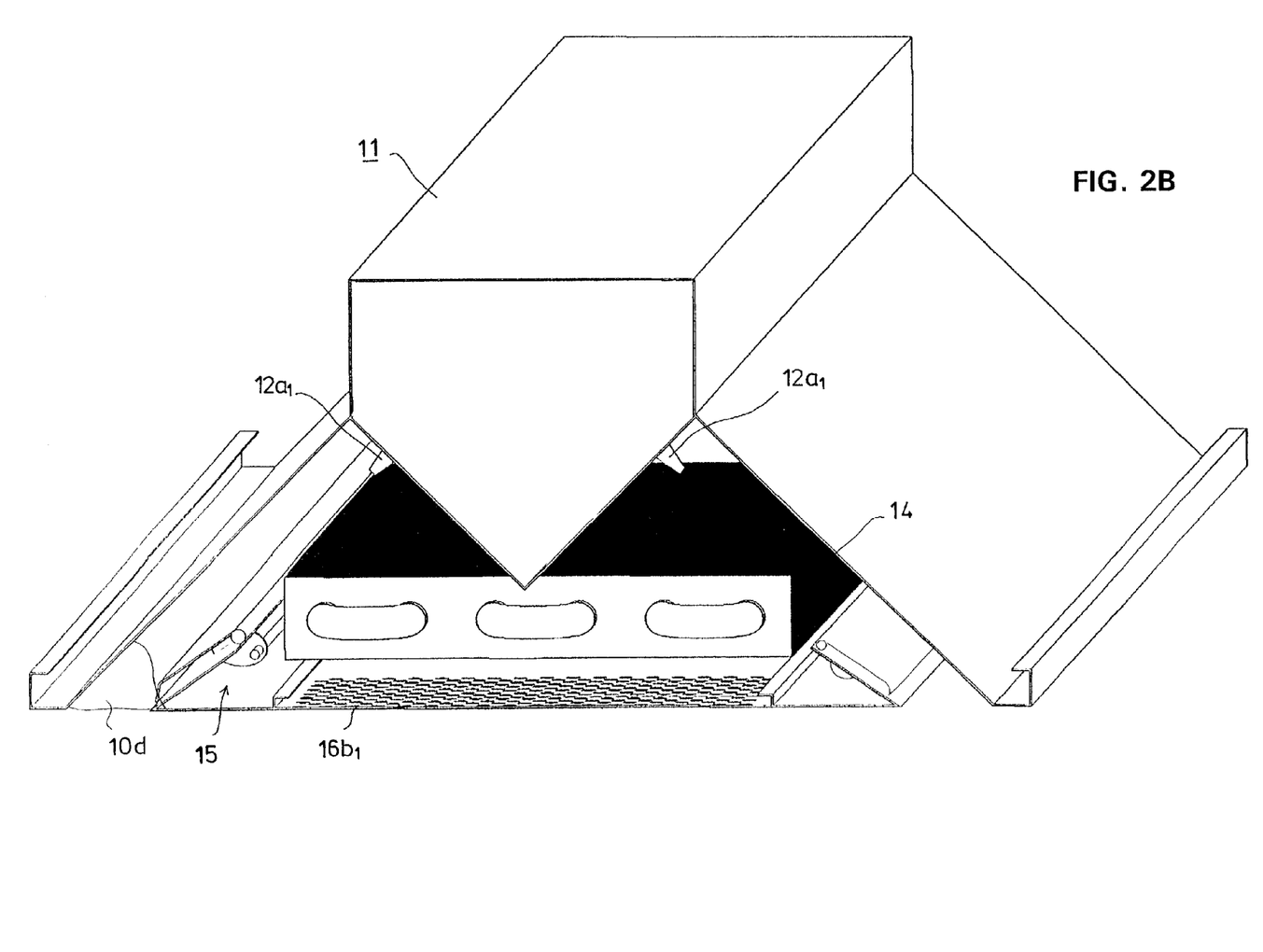
FIG. 2B is an axonometric view of a moving mechanism joined to the control device according to FIG. 2A.

FIG. 2B is an axonometric and partial view of the damper 17 of the embodiment shown in FIG. 2A. The circulated air flow $L_2$ flows through aperture plate 16b or such to heat exchanger 14 and further into side chamber $B_1$. The induction ratio is controlled by moving damper 17 in side and mixing chamber $B_1$.

Figure 3A:
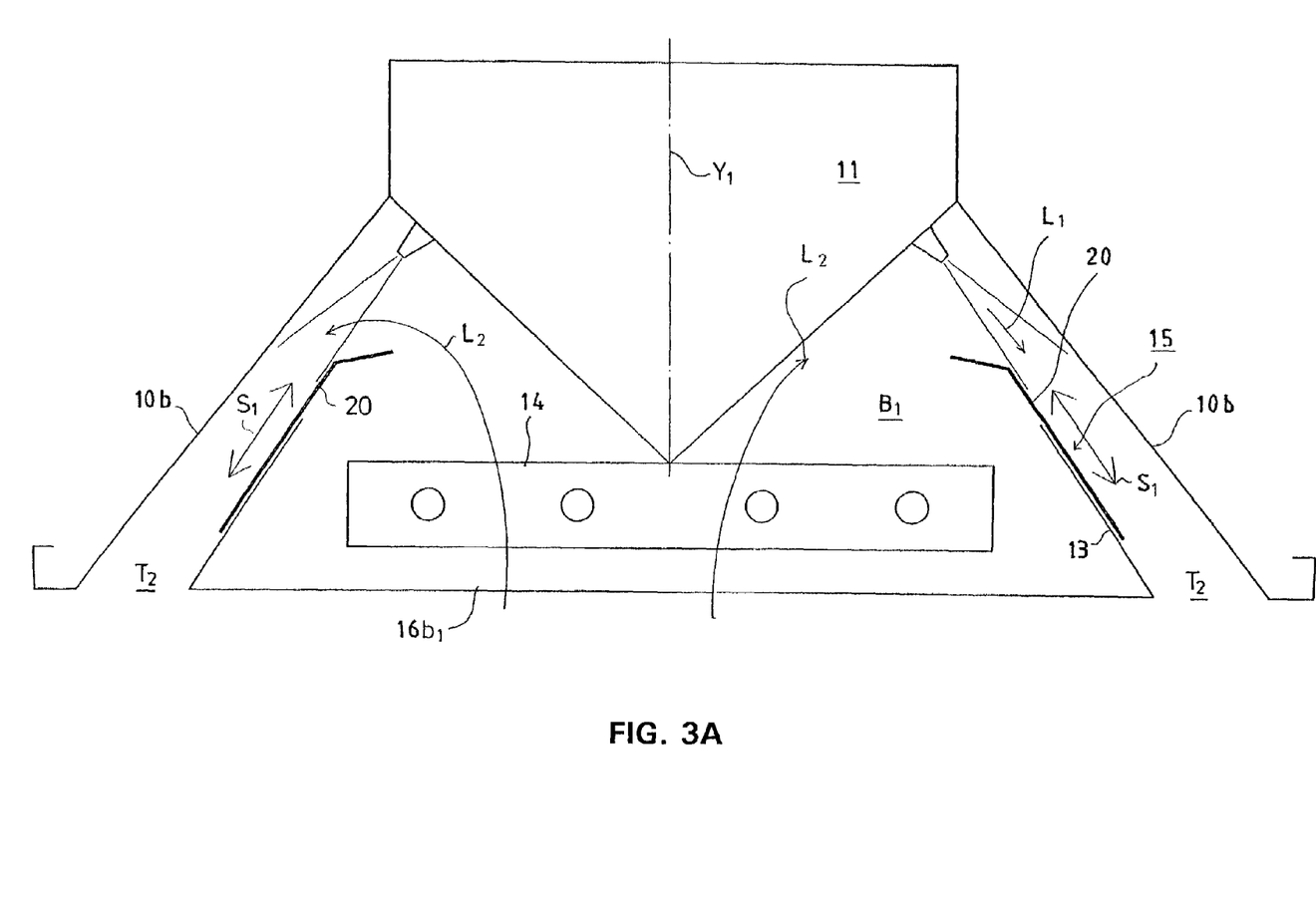
FIG. 3A shows a third advantageous embodiment of a control device connected with the device according to the invention, wherein the control device is fitted to be located on one side wall of side chamber $B_1$ to close and open the flow path for the circulated air flow from the heat exchanger into the side chamber. Control of the induction distance is hereby carried out.

FIG. 3A shows an embodiment of the invention, wherein the induction ratio control device 15 for controlling the induction ratio between the primary air flow $L_1$ and the circulated air flow $L_2$ is formed by a longitudinal plate 20, which is moved in a linear direction to close and open a flow path $E_1$ for the circulated air flow $L_2$ from heat exchanger 14 into mixing chamber $B_1$ (arrow $S_1$). The plate 20 is fitted to close and open the flow path for the circulated air flow $L_2$ between air guiding part 13 and supply air chamber 11. By moving the plate 20 into different control positions the distance induced by the supply air jet $L_1$ is controlled in side chamber $B_1$. The structure is symmetrical in relation to vertical central axis $Y_1$. The circulated air flow $L_2$ flows through an aperture plate $16b_1$ or such to heat exchanger 14 and further through flow path $E_1$ into mixing and side chamber $B_1$ in connection with supply air flow $L_1$. The combined air flow $L_1+L_2$ leaves the device as shown in the figure through the aperture $T_2$ below mixing chamber $B_1$. Aperture $T_2$ is preferably a longitudinal flow gap.

Figure 3B:
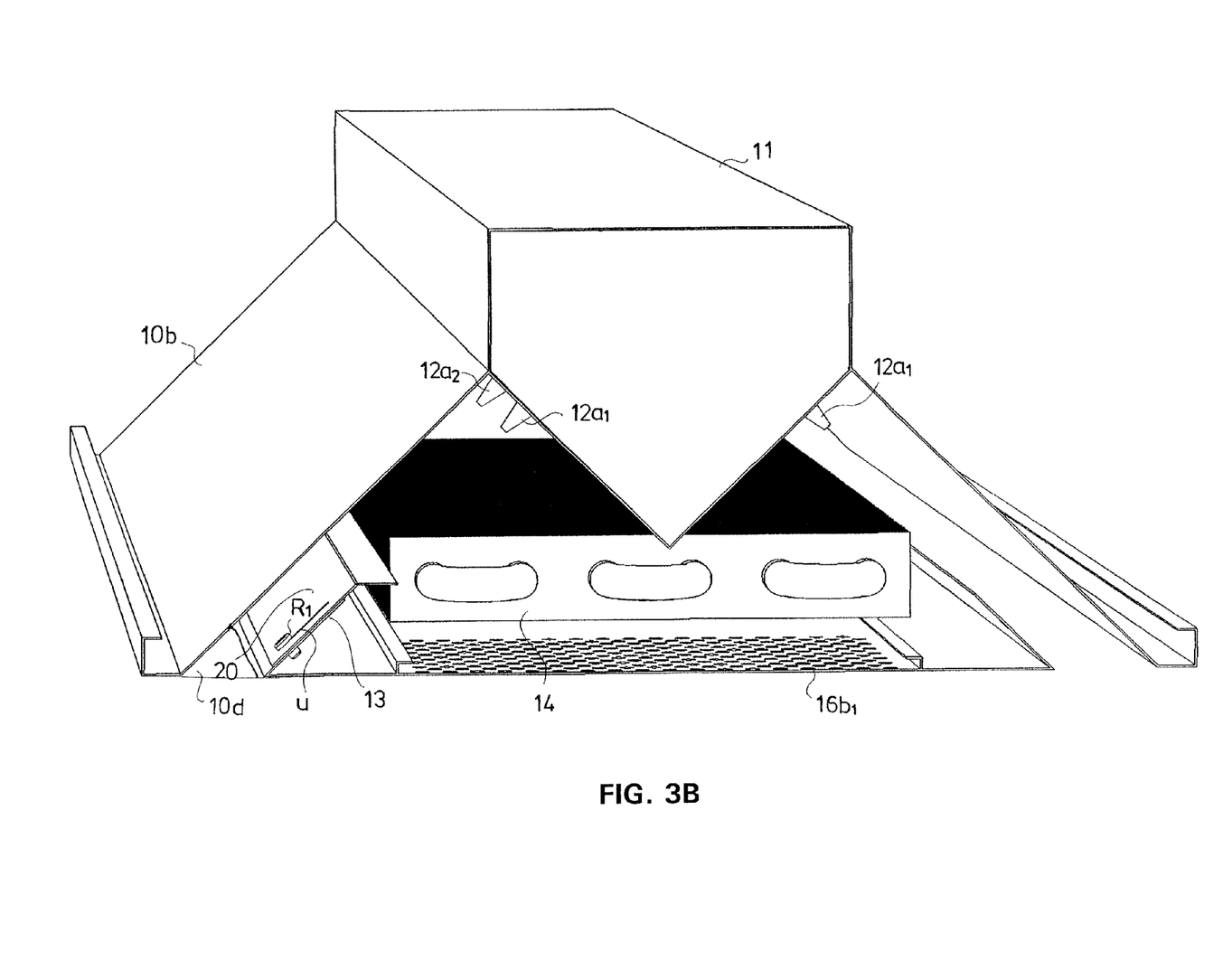
FIG. 3B is an axonometric view of a moving mechanism for the movable plate of a control device according to FIG. 3A.

FIG. 3B is an axonometric view of the embodiment shown in FIG. 3A. A screw $R_1$ can be turned into air guiding part 13 and at the same time plate 20 is fastened in a certain control position. Plate 20 includes a groove $U_1$, whereby plate 20 can be moved to the desired position in order to control the induction ratio between the flows $L_1$ and $L_2$.

Figure 3C:
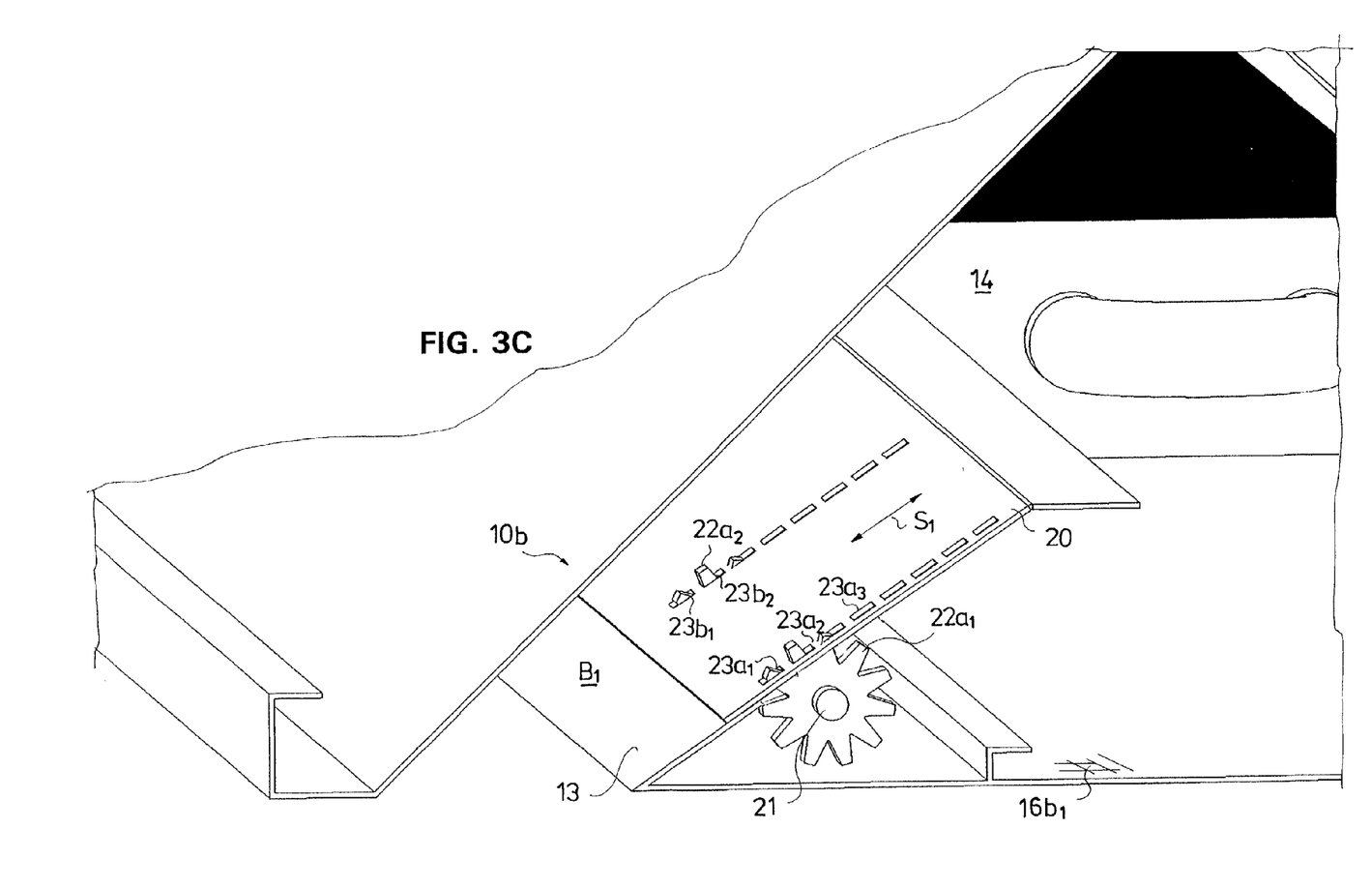
FIG. 3C shows a moving mechanism for the movable plate of FIG. 3A, which mechanism is formed by toothed gears adapted to move the plate to different control positions.

FIG. 3C is an axonometric view of an advantageous embodiment of control device 15, wherein the plate 20 of control device 15 is moved by rotating shaft 21 manually or with the aid of a motor, preferably an electric motor, which shaft 21 includes toothed gears $22a_1$, $22a_2$ connecting with apertures $23a_1$, $23a_2$ ..., $23b_1$, $23b_2$ ... in plate 20.

Figure 3D:
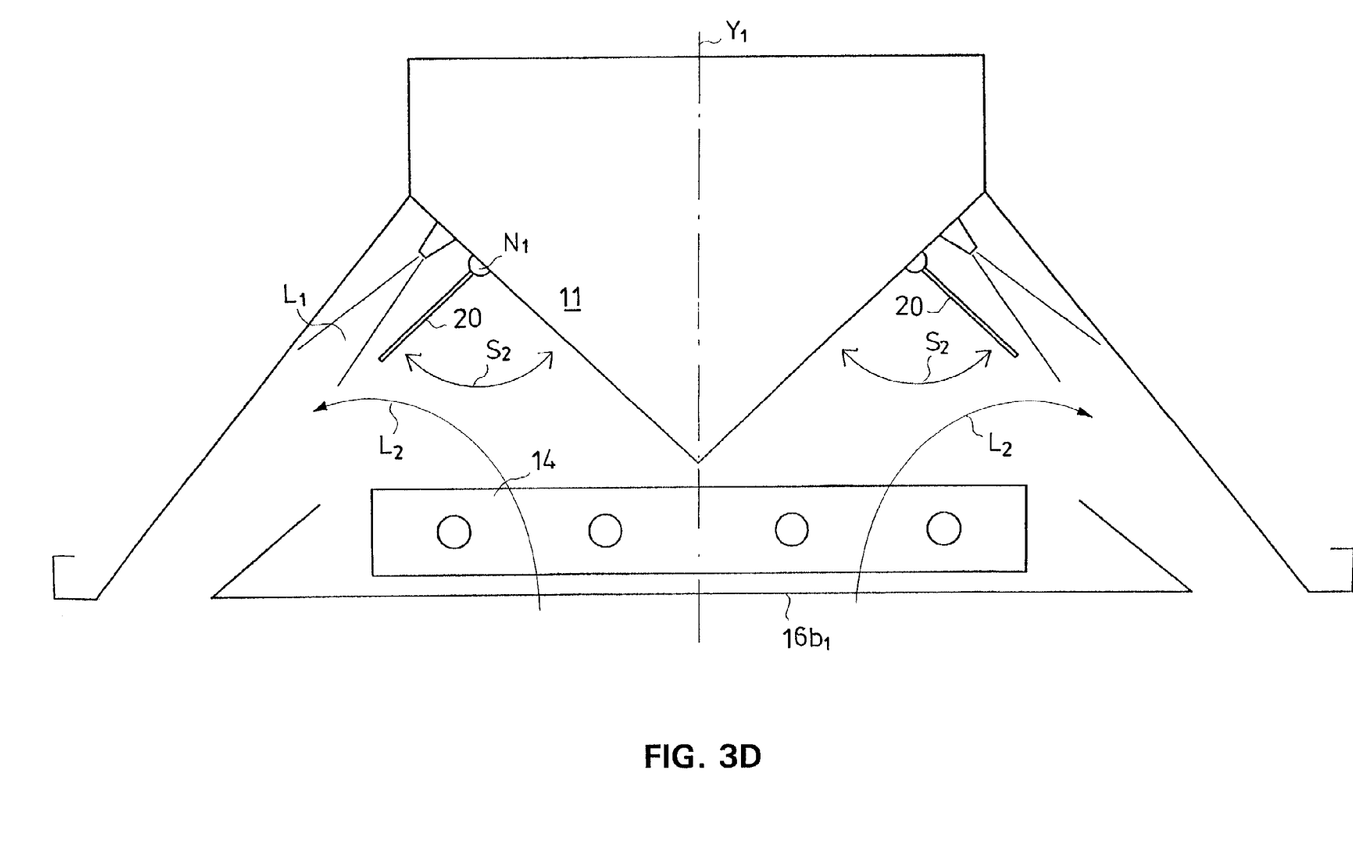
FIG. 3D shows an embodiment of the invention, wherein after the heat exchanger there is a damper articulated to the side chamber and guiding the flow of circulated air from the heat exchanger into side chamber $B_1$.

FIG. 3D shows an embodiment of the invention, wherein between air guiding parts 13 and supply air chamber 11 there is attached to the supply air chamber a longitudinal damper 20 turning around its joint $N_1$. Thus, in the embodiment shown in the figure the induction ratio control device 15 is formed by a turning damper 20, which guides the circulated air flow $L_2$ from heat exchanger 14 into side chamber $B_1$. By turning the damper 20 the induction distance of flow $L_1$ is affected and thus the induction effect of flow $L_1$ in relation to flow $L_2$ is affected. Turning of the damper 20 is indicated by arrows $S_2$.

Figures 4A, 4B:
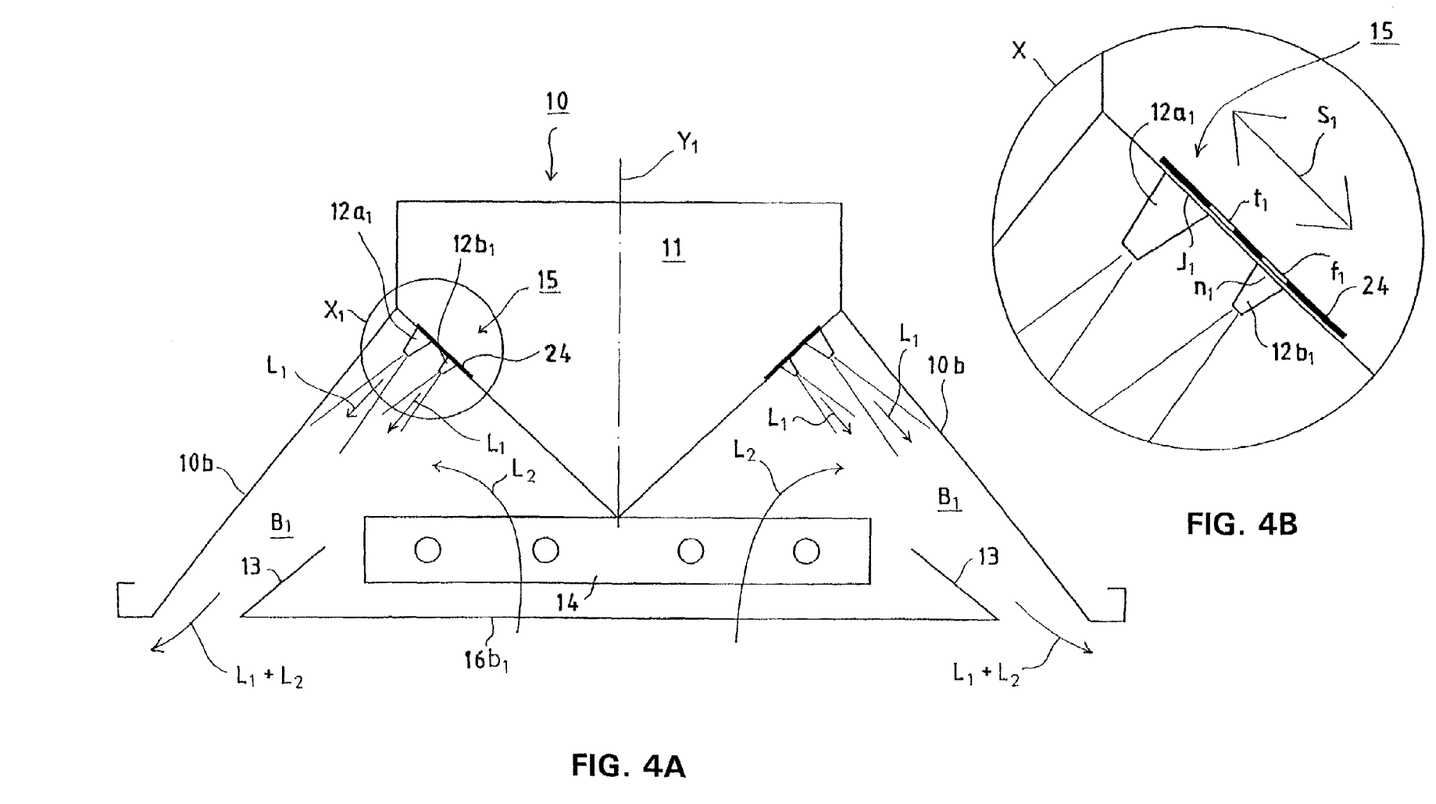
FIG. 4A shows a fourth advantageous embodiment of the induction ratio control device, wherein the device includes two nozzle rows $12a_1$, $12a_2$ . . . and $12b_1$, $12b_2$ . . . for the primary air flow $L_1$, whereby from between the nozzles of the nozzle rows the flow ratio is controlled with the aid of a control plate located in the supply chamber for the primary air flow, which control plate includes flow apertures $t_1$, $t_2$ . . . for the nozzles of one nozzle row $12a_1$, $12a_2$ . . . and flow apertures $f_1$, $f_2$ . . . for the nozzles of the other nozzle row $12b_1$, $12b_2$ . . .

FIG. 4A shows an embodiment of the invention, wherein the induction ratio control device 15 is fitted in connection with nozzles $12a_1$, $12a_2$ ..., $12b_1$, $12b_2$ ... in such a way that on the supply side of the nozzles there is an aperture plate 24, which can be brought into different control positions in relation to the supply apertures $j_1, j_2 \ldots$; $n_1, n_2 \ldots$ of nozzles $12a_1$, $12a_2$ ..., $12b_1$, $12b_2$ ...

FIG. 4B is a view on a larger scale of area $X_1$ in FIG. 4A. By moving control plate 24 as shown by arrow $S_1$ in a linear direction the position of the apertures in control plate 24 is affected in relation to the supply apertures $j_1, j_2 \ldots$; $n_1, n_2 \ldots$ of nozzles $12a_1$, $12a_2$ ..., $12b_1$, $12b_2$ ... When, in addition, the desired cross-sectional flow areas are chosen for nozzles $12a_1$, $12a_2$ ..., $12b_1$, $12b_2$ ... in relation to each other, the desired induction ratio can be controlled between flows $L_1$ and $L_2$. In the embodiment shown in FIG. 4A, the supply air chamber 11 includes two rows of nozzles side by side; a row of nozzles formed by nozzles $12a_1$, $12a_2$ ..., wherein the cross-sectional flow area of the nozzles is bigger than the cross-sectional flow area of the nozzles in the row of nozzles $12b_1$, $12b_2$ ... located below. By moving control plate 24 as shown by arrow $S_1$ in FIG. 4B in a linear direction the air flow $L_1$ from supply chamber 11 through nozzles $12a_1$, $12a_2$ ..., $12b_1$, $12b_2$ ... is controlled. Thus, by moving the control plate 25 in a linear direction (arrow $S_1$) in relation to the supply apertures $j_1, j_2 \ldots$; $n_1, n_2 \ldots$ of nozzles $12a_1$, $12a_2$ ..., $12b_1$, $12b_2$ ... the supply air flow $L_1$ can be throttled and guided as desired. The flow apertures $f_1, f_2 \ldots, t_1, t_2 \ldots$ located in two different rows in control plate 24 are brought into different covering positions in relation to the supply apertures $j_1, j_2 \ldots$; $n_1, n_2 \ldots$ of nozzles $12a_1$, $12a_2$ ..., $12b_1$, $12b_2$ ... By increasing the flow through some nozzles the flow through other nozzles is reduced and vice versa. The flow rate of flow $L_1$ into chamber $B_1$ is controlled and thus the induction ratio $Q_2/Q_1$ between the flows $L_2$ and $L_1$ is controlled.

Figure 5A:
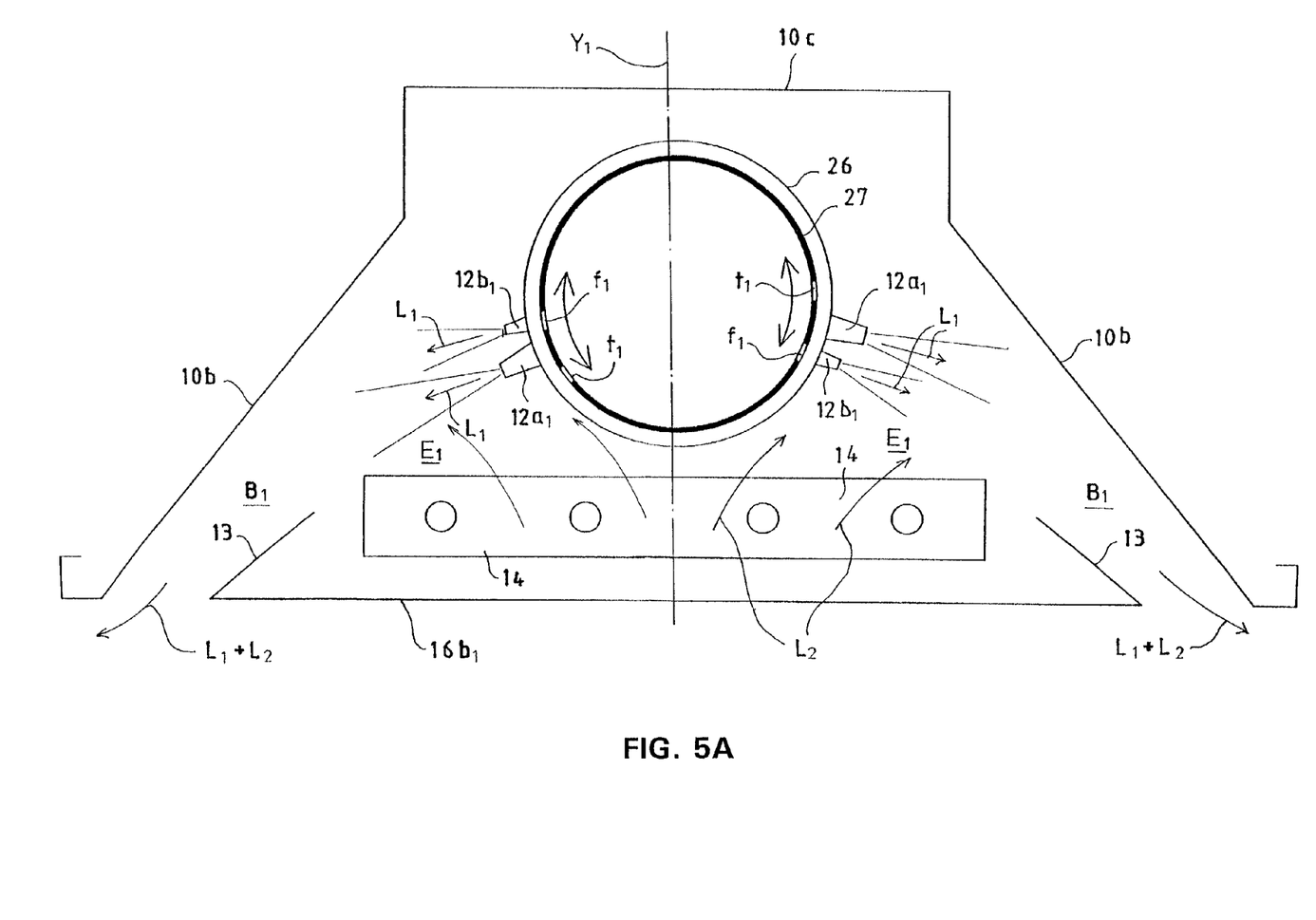
FIG. 5A shows an embodiment of the control device, wherein the supply chamber for the primary air flow on both sides of vertical central axis $Y_1$ in the supply air chamber includes two nozzle rows, whereby the nozzles in the nozzle rows have different cross-sectional flow areas, and the air flow to the nozzles is controlled by an internal tube having flow apertures by rotating the tube, whereby depending on the angle of rotation of the tube, the flow is controlled through different nozzles of the nozzle rows, and thus the induction ratio between flows $L_1$ and $L_2$ is controlled.

FIG. 5A shows an embodiment of the supply air terminal device according to the invention, wherein the supply air chamber 11 is formed by a channel shaped with a circular cross-section and including on both sides of central axis $Y_1$ nozzles $12a_1$, $12a_2$ ..., $12b_1$, $12b_2$ ..., however, so that as shown in the figure on the left side there are the nozzles $12b_1$, $12b_2$ ... with the smaller cross-sectional flow area above the row of nozzles $12a_1$, $12a_2$ ... with the bigger cross-sectional flow area, and on the right side of central axis $Y_1$ in the figure the order of nozzles is the other way round, that is, the row of nozzles $12b_1$, $12b_2$ ... with the smaller cross-sectional flow area is located below the row of nozzles $12a_1$, $12a_2$ ... with the bigger cross-sectional flow area. Inside supply air chamber 11 there is an induction ratio control device 15 in the form of a turning tube 27, which includes flow apertures $f_1, f_2 \ldots, t_1, t_2 \ldots$ for the nozzles $12a_1$, $12a_2$ ..., $12b_1$, $12b_2$ ... located on both sides of central axis $Y_1$. Thus, by turning the tube 27 the air is made to flow e.g. as shown in the figure only through the nozzles $12a_1$, $12a_2$ ... with the bigger cross-sectional flow area or through the nozzles $12b_1$, $12b_2$ ... with the smaller cross-sectional flow area. In this way the flow rate of flow $L_1$ can be controlled in side chamber $B_1$ and thus the induction effect of the said flow $L_1$ on flow $L_2$ is controlled. By controlling flow $L_1$ the desired induction ratio between the flows $L_2$ and $L_1$ is thus controlled. As is shown in the figure, the supply chamber 11 with the circular cross section is located above heat exchanger 14 and centrally in the structure. In the embodiment shown in the figure, the device includes a top ceiling plate 10c connecting the side plates 10b, whereby the structure is formed as one which is closed at the top and on the sides and which is open downwards.

Figure 5B:
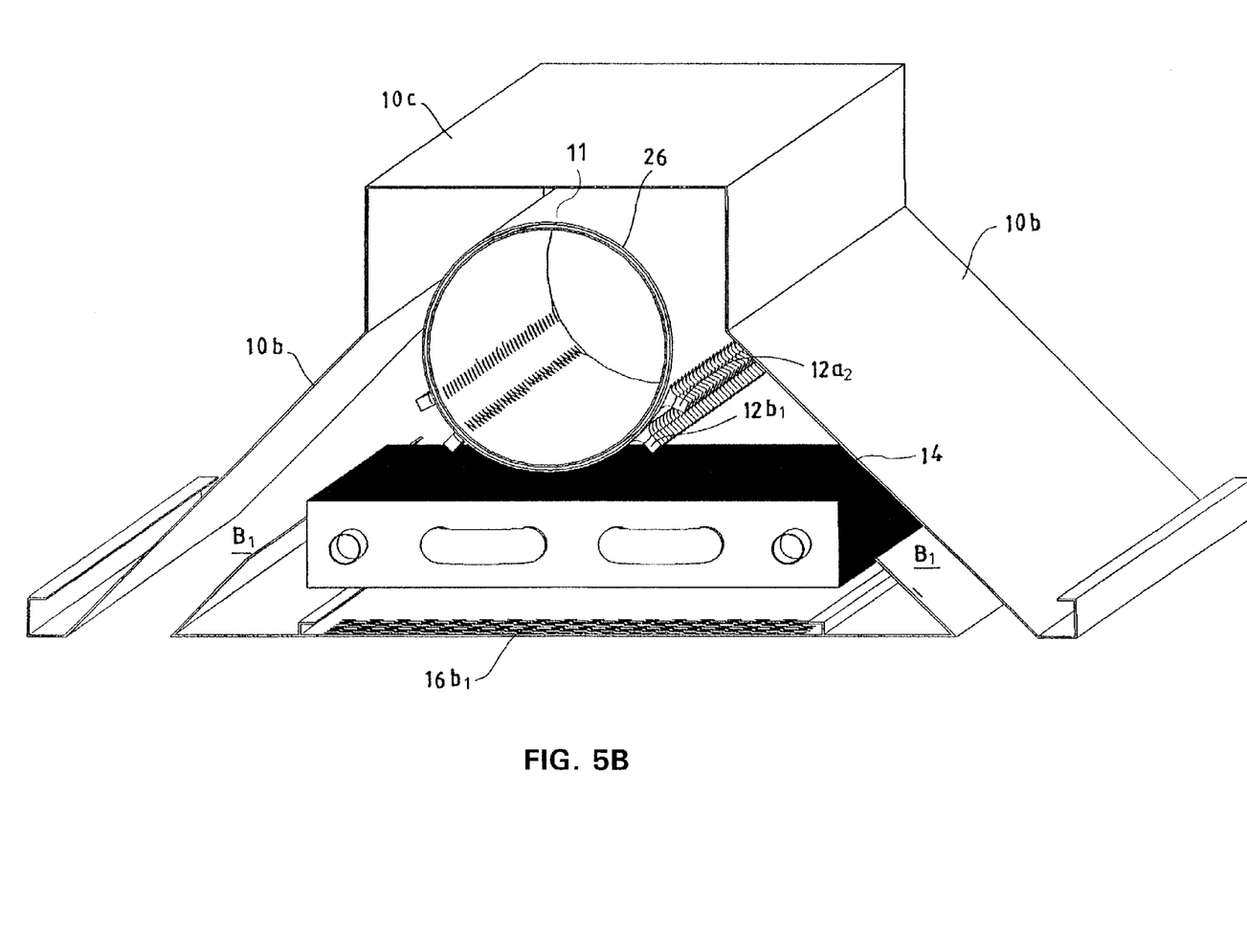
FIG. 5B is an axonometric partial view of the structure shown in FIG. 5A.

FIG. 5B is an axonometric partial view of the device in FIG. 5A.

We claim:

1. A supply air terminal device, comprising:
   a housing having top and side walls, and open below defining a supply air chamber from which supply air is provided and side chambers in which the supply air and circulated air from a room space is mixed;
   air guiding parts arranged on both sides of a central axis of said housing, a flow path leading from said side chamber to an exterior and below said housing and through which the mixed supply air and circulated air passes being defined in said side chamber and at least in part by said air guiding parts;
   a heat exchanger arranged below said supply air chamber and between said air guiding parts;
   nozzles arranged in connection with said supply air chamber to direct supply air from said supply air chamber into said side chambers and induce a flow of circulated air from the room space through said heat exchanger into said side chambers;
   a control device arranged in each of said side chambers placed after the heat exchanger and nozzles for controlling an induction ratio between a flow of supply air through said nozzles and the flow of circulated air through said heat exchanger induced by said nozzles, each of said control devices including a turning damper arranged in said side chamber after said heat exchanger in a direction of flow of the circulated air and to regulate opening and closing of the flow path through which the mixed supply air and circulated air passes from said side chamber to exterior of said housing such that said damper is effective to regulate a flow of mixed supply air and circulated air from said housing; and
   a piece which engages with said turning damper to cause rotational movement of said turning damper about a joint, said turning damper being rotatably supported about said joint, and said turning damper enabling an induction ratio $Q_2/Q_1$ between flows $L_2$ and $L_1$ to be controlled within a range of 2–6.

2. The supply air terminal device of claim 1, wherein said heat exchanger is arranged to cool or heat the circulated air.

3. The supply air terminal device of claim 1, wherein said housing includes side plates, each of said side chambers being partially defined by a respective one of said side plates.

4. The supply air terminal device of claim 1, wherein said housing includes side plates and end walls, each of said side chambers being defined by said end walls and a respective one of said side plates.

5. The supply air terminal device of claim 1, wherein said side chambers are arranged at least partially below said supply air chamber.

6. The supply air terminal device of claim 1, wherein said air guiding parts are arranged to cause the mixed supply air and circulated air to flow to a side of said housing.

7. The supply air terminal device of claim 1, wherein said housing has a longitudinal dimension, said damper of each of said control devices extending longitudinally.

8. The supply air terminal device of claim 1, wherein each of said control devices further includes a joint for supporting said damper and to enable said damper to be positioned in any one of a plurality of different positions.

9. The supply air terminal device of claim 1, wherein said turning damper is rotatably supported about a joint, said piece comprises an eccentric piece engaging with said damper to cause rotational movement of said damper about said joint.

10. The supply air terminal device of claim 1, wherein the flow path is defined between said housing and each of said air guiding parts.

11. The supply air terminal device of claim 1, wherein said heat exchanger is arranged between said dampers.

12. The supply air terminal device of claim 1, wherein said housing is closed at its top and on its sides.

13. The supply air terminal device of claim 12, wherein said housing is closed by end walls, side plates and said supply air chamber.

* * * * *